Oct. 8, 1929.  J. W. CARNAHAN  1,730,559
METHOD OF ASSEMBLING RESILIENT WHEELS
Filed Sept. 17, 1927  3 Sheets-Sheet 2
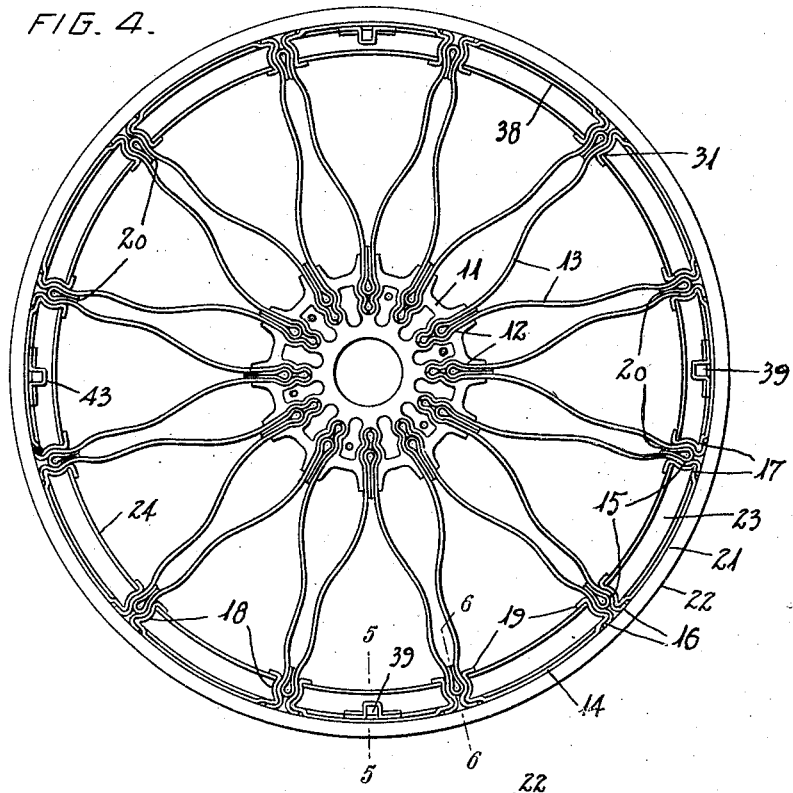
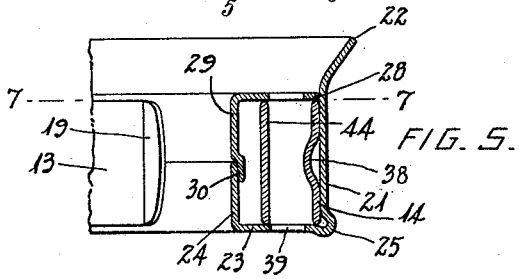
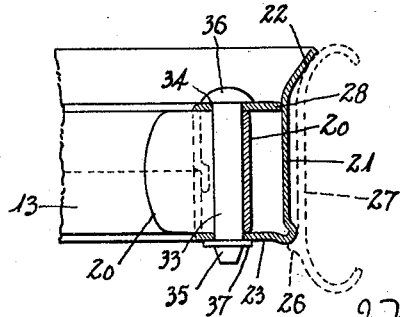

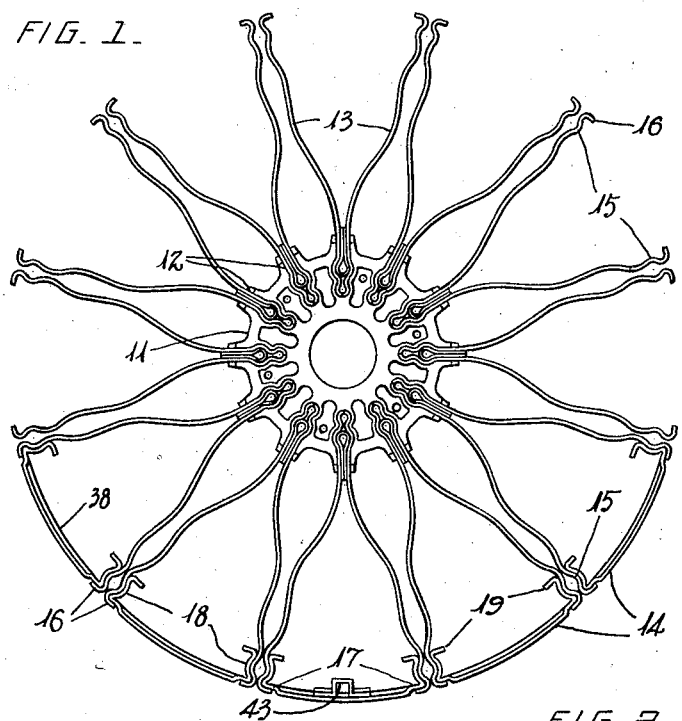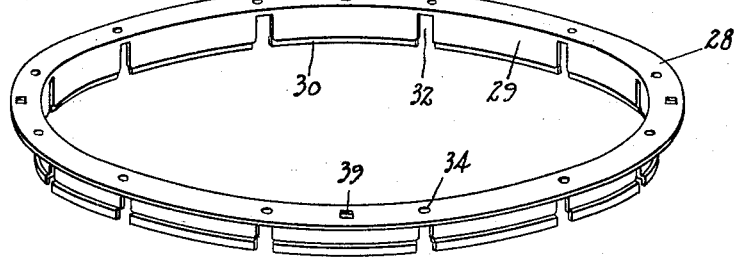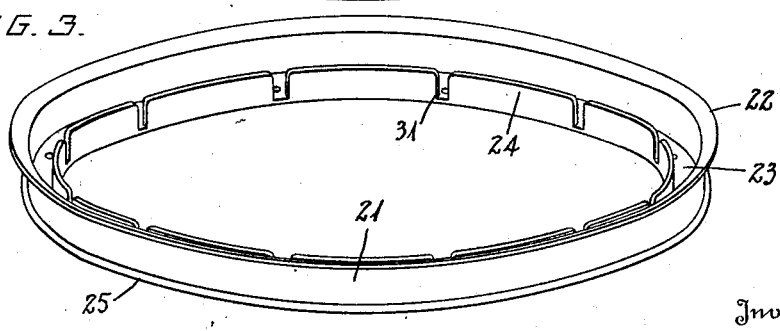

Oct. 8, 1929.  J. W. CARNAHAN  1,730,559
METHOD OF ASSEMBLING RESILIENT WHEELS
Filed Sept. 17, 1927   3 Sheets-Sheet 3
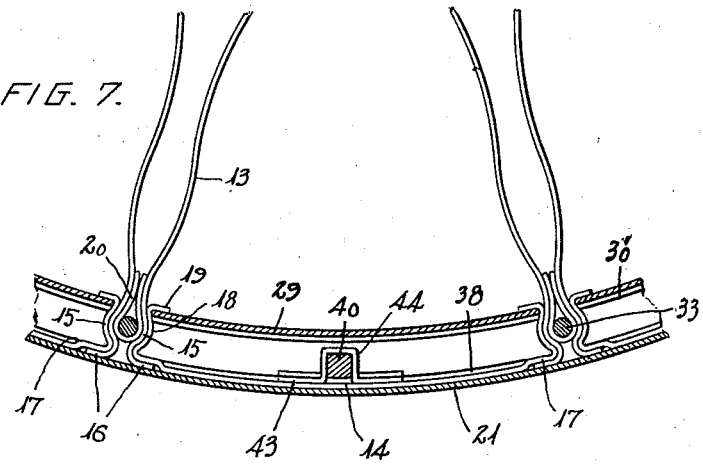
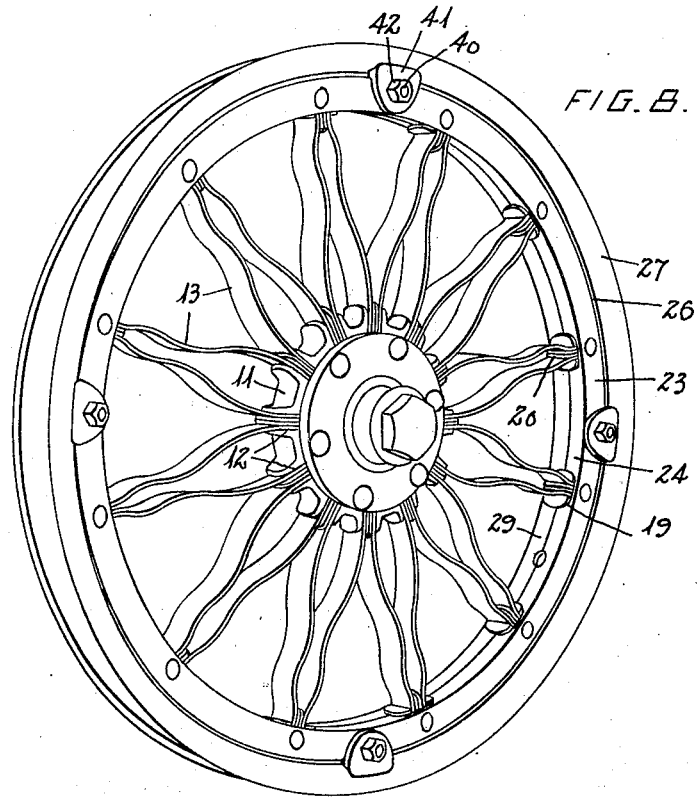

Patented Oct. 8, 1929

1,730,559

UNITED STATES PATENT OFFICE

JOHN WORTH CARNAHAN, OF PHILADELPHIA, PENNSYLVANIA

METHOD OF ASSEMBLING RESILIENT WHEELS

Application filed September 17, 1927. Serial No. 220,107.

The present invention relates to resilient metal wheels for automobiles and other vehicles, and aims to provide a novel method of assembling the elements of the wheel which is an improvement over the disclosure in my Patent No. 1,545,736, granted July 14, 1925.

One object of the invention is the provision of a novel and improved method of assembling the hub, resilient spokes and felly members in a manner that will obtain the desired tensing of the spokes, in order that the spokes will be gradually tensed as the parts are assembled and will receive the desired equal tension in the completed wheel.

The tensing of the spokes between the hub and felly is of importance to maintain the hub and felly concentric under ordinary loads, and to suspend the hub and axle load by the upper spokes from the upper arch of the felly, in order to absorb shocks. The spokes being under equal tension will result in the torque strains due to propulsion or braking action being distributed equally to the spokes so as to avoid excessive strains on individual spokes.

With the foregoing and other objects in view, which will be apparent as the invention is more fully understood, the invention resides in the method of assembly and construction of the parts of the wheel, as hereinafter described and claimed, it being understood that changes can be made within the scope of what is claimed, without departing from the spirit of the invention.

The invention is illustrated in the accompanying drawings, wherein—

Figure 1 is an elevation illustrating the spokes assembled with the hub member, and some of the compression members of the felly assembled with the spokes.

Fig. 2 is a perspective view of one of the annular sections or rings of the felly.

Fig. 3 is a perspective view of the companion annular section or ring of the felly which has as a part thereof the felly band.

Fig. 4 is an elevation illustrating the assembled hub member, spokes and compression members being assembled with the felly section or ring shown in Fig. 3.

Fig. 5 is an enlarged cross-section of the felly, on the line 5—5 of Fig. 4, illustrating the assembly of the felly section or ring shown in Fig. 2 with the parts shown in Fig. 4.

Fig. 6 is an enlarged section on the line 6—6 of Fig. 4 illustrating one of the securing and expanding pins forced into place, and also illustrating in dotted lines the demountable tire rim on the felly.

Fig. 7 is a sectional detail of the completed wheel taken on the line 7—7 of Fig. 5.

Fig. 8 is a perspective view of the completed wheel with the tire rim thereon.

The wheel, in its general construction, when the elements thereof are assembled by the present method, is similar to the wheel disclosed in my Patent No. 1,545,736, with some exceptions as hereinafter pointed out, and the hub member 11 as shown is the same as that disclosed in my Patent No. 1,559,673, although any other suitable hub member may be employed. The hub member has radial slots 12 in which the inner terminals of the resilient spokes 13 are securely anchored to prevent the spokes from tearing loose. The spokes are formed, as shown, from metal strips of uniform width and thickness, although spokes varying in width and thickness may be employed, and the spokes are curved so as to be capable of being brought under resilient tension. Arcuate compression members 14, forming part of the felly construction, are assembled with the outer terminals of the spokes. The members 14, as shown, are formed from strips of suitable metal. The spokes 13 are arranged in pairs and the spokes of each pair are provided adjacent to their outer terminal with the complementary curved portions 15 offset away from one another, and the terminals 16 of the spokes are bent away from one another at an angle immediately beyond the portions 15. The members 14 have the offsets 17 to overlap the inner sides of the terminals 16, and curved abutments 18 extend inwardly from the portions or offsets 17 to bear against the opposite sides of the portions 15 of the spokes. The abutments 18 have lips 19 extending therefrom away from the spokes.

The first step in assembling the parts of the wheel is to slip the spokes edgewise into the slots 12 of the hub member 11 and to anchor said spokes securely in said hub member. This is shown in Fig. 1, with the free spokes at the upper portion. With this assembly of the spokes and hub member, the terminals 16 of the spokes are spaced a distance from the center of the hub member less than the distance or radius which they assume in the completed wheel, and the spokes are stretched and brought under tension as the assembly progresses.

The compression members 14 are next assembled with the spokes in the second step of the process, being slipped edgewise between the pairs of spokes, as seen at the lower portion of Fig. 1. The compression members 14 are slightly longer than the spaces between the outer terminals of the pairs of spokes, in order that when the members 14 are slipped between the pairs of spokes, the spokes of the pairs will be brought into contact adjacent to the portions 15, as seen at the lower part of Fig. 1. However, the members 14 may be readily forced into place, until the last member 14 is reached, in which event it is necessary to forcibly separate the corresponding pairs of spokes in order that the last compression member 14 may be forced home. This results in the members 14 being brought under an initial compression, and the circle defined by the outer terminals 16 of the spokes in their original form, is increased in diameter. Thus, the combined lengths of the members 14 and thicknesses of the outer terminals of the spokes is greater than the circumference of the circle in which the terminals 16 of the spokes are originally disposed, prior to the assembly of the members 14 with the spokes. Consequently the diameter of the circle being increased, will impose strain on the spokes, and will therefore give the spokes their initial tension. The spokes are anchored between the members 14, because of the interengagement of the portions 15 and abutments 18, so that the members 14 are under compression while the spokes are under tension, but not to the full extent that exists in the completed wheel, as will hereinafter more fully appear.

The third step consists in driving or forcing spring keys 20 between the spokes of each pair at a point between the ends of the companion members 14. The keys 20 are formed from resilient sheet metal and are doubled so as to provide a loop between the portions 15 of the spokes and terminal portions extending inwardly. The edges of the keys 20, as well as the edges of the spokes 13 and members 14 are rounded, to facilitate the edgewise movement of the parts together. The keys 20 are driven between the portions 15 of the spokes, which, as seen at the lower portion of Fig. 1, are in contact, so that the keys will separate the outer terminals of the spokes, thereby placing greater compression force on the members 14, and in order that the keys 20 may be forced into place, it is necessary for the circle defined by the members 14 to increase in diameter. This will result in the members 14 being forced slightly away from the center of the hub member, thereby imposing a second and increased tensile strain on the spokes. The keys may be driven into place in succession, or may be started into place and then forced home simultaneously in a press.

The assembled hub member, spokes, compression members and keys are then ready for assembly with the felly. The felly is composed of two annular sections or rings as shown in Figs. 2 and 3. The section shown in Fig. 3 comprises the felly band 21 having an outturned flange 22 at one edge and an inturned annular flat side wall 23 at its opposite edge, with a flange 24 extending from the wall 23, said band 21 and flange 24 being cylindrical and concentric. The bend between the band 21 and wall 23 is formed with an outstanding bead 25 to enable the parts within the felly to fit close into the corner, and the bead 25 is also adapted for the contact of the rib 26 on the inner periphery of the demountable tire rim 27 which may be of the clincher or other suitable type. The other felly section comprises the annular flat wall 28 having the cylindrical flange 29 at its inner edge. The wall 28 is adapted to move into the band 21 and the flange 29 complements the flange 24 to constitute the inner periphery of the felly. As shown, the flange 29 has an offset edge portion 30 to slip behind the edge of the flange 24, to close the joint between the flanges. The flanges 24 and 29 have the open slots 31 and 32, respectively, to receive the spokes and abutments 18 of the members 14, and the open ends of the slots are slightly widened or have their corners rounded off to facilitate assembly.

The fourth step in the assembly consists in forcing the assembled hub member, spokes, compression members and keys into the felly band 21 and behind the flange 24 of the felly section shown in Fig. 3. This may be done in a press, and if the members 14 are bowed or sprung outwardly slightly due to the compression imposed thereon, said members in being forced within the band 21 will be restored to their intended curvature, as well as bringing said members and felly band into tight contact. The outer terminals of the spokes pass into the slots 31 with the abutments 18, and the lips 19 overlap the inner surfaces of the flange 24 beyond the edges of the slots 31. The felly band 21 being perfectly round will preserve the circular shape of the felly, and on account of the assembly of the members 14 and keys 20 with the spokes, as aforesaid, the tension is distributed equally to the spokes, and this distribution of tension is maintained after the spokes are forced with the members 14 and keys 20 into the first felly section, as seen in Fig. 4.

The fifth step of the method of assembly consists in forcing the second felly section into place, as seen in Fig. 5, the flange 29 being forced down into the spaces between the abutments 18 of the compression members with the wall 28 moved into the felly band 21. The slots 32 receive the spokes and abutments 18, and the edge portion 30 moves behind the flange 24.

The sixth and final step consists in forcing pins 33 into the keys 20. The side walls 23 and 28 of the felly sections have apertures 34 which register with the loops of the keys 20, and the pins 33 are driven into said apertures and loops. The pins have tapered ends 35, and said pins are oversize, so that when the pins are driven into the keys, the keys are expanded, thereby separating the portions 15 of the spokes and the abutments 18. This forces the abutments 18 tightly into engagement with the edges of the slots 31 and 33, to provide a tight fit and to prevent the parts from rubbing or becoming loose. The insertion of the pins will also separate the spokes slightly and add compression stress to the members 14, so as to increase the tension of the spokes still further. The pins being driven into place will also result in the various parts of and within the felly being forced tightly into contact under high pressure to prevent any looseness, rubbing or squeaking.

As shown, the pins 33 are in the form of rivets having the heads 36 bearing against the wall 28, and the tapered ends 35 are formed into heads by swaging, it being preferable to place washers 37 on the pins or rivets before forming said heads.

As shown, the compression members 14 are formed with longitudinal ribs 38 extending to the offsets 17, in order to strengthen and stiffen said members, although the members 14 may be flat transversely if desired.

The felly walls 23 and 28 have the apertures 39, to receive bolts 40, which fasten the rim clips 41 to the felly. The apertures 39 and bolts 40 are of square outline, as shown, to prevent the bolts from turning when the nuts 42 are screwed thereon. Straps 43 are welded or otherwise secured to the members 14 where the bolts 40 are located, and have the offsets 44 through which the bolts 40 extend. The straps 43 and their offsets are disposed between the side walls 23 and 28 of the felly to receive the compression when the bolts 40 are tightened, so as to prevent collapsing of the shell of the felly. The members 14 are disposed between the side walls of the felly to assist in preventing said side walls from collapsing when the pins or rivets 33 are secured.

As an alternative method, the third and fourth steps hereinbefore described may be reversed, that is, the fourth step may precede the third step. Thus, after the compression members 14 are assembled with the spokes, as illustrated at the lower part of Fig. 1, the spokes and compression members may be forced into the first felly section, and the abutments 18 and portions 15 of the spokes being moved together will enable said abutments to move freely into the slots 31. The keys 20 are then driven between the portions 15 of the spokes, thereby simultaneously separating the spokes and causing expansion of the members 14 to take place within the felly section, so as to tension the spokes 13 and also clamp the abutments 18 against the edges of the slots 31. Thus, the assembled hub member, spokes and compression members may be assembled with the first felly section before or after the keys 20 are driven into place between the spokes, but the first method described is preferred, inasmuch as with the second method it is essential that the hub member be maintained concentric with the felly section, while the keys 20 are driven into place, for otherwise the spokes may be tensed unequally as the successive keys are forced home.

In the completed wheel the members 14, keys 20, abutments 18, pins 33, portions 15 of the spokes, and flanges 24 and 29 are all under compression, and the felly is prevented from bursting by the side walls 23 and 28 and felly band 21. The spokes 13 are under tension, having been stretched or their radial dimensions increased, whereby the spokes tend to pull the hub member and felly together, but the tension being distributed will maintain the hub and felly concentric under normal loads. The hub member is yieldingly suspended from the upper arch of the felly, so that under abnormal strains the hub and upper arch of the felly may separate slightly, to absorb shocks, but the hub and felly will be immediately restored to concentric relation after displacement. The hub member and felly may also have slight relative rotation due to torque resulting from the turning of the hub member by power from the engine or the retarding of the hub member when applying the brakes. This provides for a yielding shock absorbing action.

Having thus described the invention, what is claimed as new is:—

1. The method of assembling a wheel of the character described consisting in anchoring resilient spokes, having felly engaging portions at their outer terminals adapted to resist movement radially of the felly, to a hub member, then assembling compression members of a sectional felly having complementary spoke engaging portions with the outer terminals of the spokes in a manner to increase the circle of the felly engaging spoke portions and so tense the spokes, and assembling said compression members and tensed spokes with an embracing felly band.

2. The method of assembling a wheel of the character described consisting in anchoring resilient spokes, having felly engaging portions at their outer terminals adapted to resist movement radially of the felly, to a hub member, then forcing compression members of a sectional felly having complementary spoke engaging portions between the outer terminals of the spokes to bring the compression members under compression and to increase the circle of the felly engaging spoke portions and thereby bring the spokes under tension, and then forcing said compression members with the spokes into an embracing felly band.

3. The method of assembling a wheel of the character described consisting in anchoring pairs of resilient spokes, having felly engaging portions at their outer terminals adapted to resist movement radially of the felly, to a hub member, then forcing compression members of a sectional felly having complementary spoke engaging portions between the outer terminals of the pairs of spokes to bring the spokes of each pair into contact, to bring said members under compression and to increase the circle of the felly engaging spoke portions and thereby bring the spokes under tension, and then forcing said compression members with the spokes into an embracing felly band.

4. The method of assembling a wheel of the character described consisting in anchoring pairs of resilient spokes, having felly engaging portions at their outer terminals adapted to resist movement radially of the felly, to a hub member, then forcing compression members of a sectional felly having complementary spoke engaging portions between the outer terminals of the pairs of spokes to bring the spokes of each pair into contact, then forcing keys between the spokes of the pairs to separate the spokes and to bring the compression members under compression and to increase the circle of the felly engaging spoke portions and thereby bring the spokes under tension, and then forcing said compression members with the spokes into an embracing felly band.

5. The method of assembling a wheel of the character described consisting in anchoring pairs of resilient spokes, having felly engaging portions at their outer terminals adapted to resist movement radially of the felly, to a hub member, then forcing compression members of a sectional felly having complementary spoke engaging portions between the outer terminals of the pairs of spokes to bring the spokes of each pair into contact, then forcing keys between the spokes of the pairs to separate the spokes and to bring the compression members under compression and to increase the circle of the felly engaging spoke portions and thereby bring the spokes under tension, then forcing said compression members with the spokes into an embracing felly band, and then forcing pins into the keys to expand the keys and increase the compression on said compression members.

6. The step in the method of assembling a wheel of the character described consisting in anchoring resilient spokes, having felly engaging portions at their outer terminals adapted to resist movement radially of the felly, to a hub member, and forcing between the outer terminals of the spokes compression members of a sectional felly having complementary spoke engaging portions which are of a length greater than the normal spaces between the outer terminals of the spokes, so as to increase the circle of the felly engaging spoke portions and so tensing the spokes under the compression of said members.

In testimony whereof I hereunto affix my signature.

J. WORTH CARNAHAN.